United States Patent
Yagi et al.

(10) Patent No.: US 9,269,124 B2
(45) Date of Patent: Feb. 23, 2016

(54) IMAGE PROCESSING DEVICE, IMAGE PROCESSING METHOD, PROGRAM FOR IMAGE PROCESSING DEVICE, RECORDING MEDIUM, AND IMAGE DISPLAY DEVICE

(71) Applicant: DAI NIPPON PRINTING CO., LTD., Tokyo (JP)

(72) Inventors: Takuya Yagi, Tokyo (JP); Kyoji Yoshino, Tokyo (JP); Koji Inagaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/366,005

(22) PCT Filed: Dec. 18, 2012

(86) PCT No.: PCT/JP2012/082749
§ 371 (c)(1),
(2) Date: Jun. 17, 2014

(87) PCT Pub. No.: WO2013/094588
PCT Pub. Date: Jun. 27, 2013

(65) Prior Publication Data
US 2014/0314336 A1    Oct. 23, 2014

(30) Foreign Application Priority Data

Dec. 19, 2011 (JP) ................. 2011-277449

(51) Int. Cl.
*G06T 3/00* (2006.01)
*H04N 5/217* (2011.01)
(Continued)

(52) U.S. Cl.
CPC ............. *G06T 3/0018* (2013.01); *G06T 3/0062* (2013.01); *H04N 1/3878* (2013.01); *H04N 5/217* (2013.01); *H04N 5/2259* (2013.01)

(58) Field of Classification Search
CPC ..... G06T 3/0018; G06T 3/0062; G06T 5/006; G06T 15/20; G06T 2200/32; G06T 2207/30041; G06T 3/0043; H04N 5/23238; H04N 5/2628; H04N 5/2259; G02B 13/06
See application file for complete search history.

(56) References Cited

U.S. PATENT DOCUMENTS 5,185,667 A * 2/1993 Zimmermann .......... 348/207.99
5,359,363 A * 10/1994 Kuban et al. .................... 348/36
(Continued)

FOREIGN PATENT DOCUMENTS

JP          64-020830        1/1989
JP        2003-078907        3/2003
(Continued)

OTHER PUBLICATIONS

International Search Report—PCT/JP2012/082749—Feb. 12, 2013.

*Primary Examiner* — Jingge Wu
(74) *Attorney, Agent, or Firm* — Young & Thompson

(57) ABSTRACT

A distorted image (S) is acquired through a photographing operation using a wide-angle lens or an omnidirectional mirror. A cutting reference point (P) for cutting a partial cut region from the distorted image is set. The cut region is set according to the cutting reference point. An eye vector (n) corresponding to the cutting reference point is set with a photographing viewpoint of the distorted image as a base point. The cut region is shifted by a predetermined distance from the cutting reference point. The shifted cut region is transformed through image transformation to transform the distorted image into a planar regular image (T') according to the eye vector. The shifted cut region (E') is transformed.

13 Claims, 16 Drawing Sheets

(51) Int. Cl.
*H04N 5/225* (2006.01)
*H04N 1/387* (2006.01)

(56) References Cited

U.S. PATENT DOCUMENTS

| | | | |
|---|---|---|---|
| 7,714,936 B1* | 5/2010 | Martin et al. | 348/576 |
| 7,961,980 B2* | 6/2011 | Shih | 382/285 |
| RE43,490 E* | 6/2012 | Gullichsen et al. | 348/207.99 |
| 2001/0010555 A1* | 8/2001 | Driscoll, Jr. | 348/335 |
| 2004/0247173 A1* | 12/2004 | Nielsen et al. | 382/154 |
| 2009/0010630 A1* | 1/2009 | Higashibara et al. | 396/50 |
| 2010/0053325 A1* | 3/2010 | Inagaki | 348/143 |
| 2012/0093365 A1* | 4/2012 | Aragane et al. | 382/103 |
| 2014/0313377 A1* | 10/2014 | Hampton | 348/241 |

FOREIGN PATENT DOCUMENTS

| | | |
|---|---|---|
| JP | 2003-212041 | 7/2003 |
| JP | 2010-062790 | 3/2010 |
| JP | 2010-224691 | 10/2010 |
| WO | 2011/158343 | 12/2011 |

\* cited by examiner

IMAGE PROCESSING DEVICE, IMAGE PROCESSING METHOD, PROGRAM FOR IMAGE PROCESSING DEVICE, RECORDING MEDIUM, AND IMAGE DISPLAY DEVICE

TECHNICAL FIELD

The present invention relates to an image processing device, an image processing method, a program for an image processing device, a recording medium, and an image display device, which are capable of processing an image photographed using a wide-angle lens or an omnidirectional mirror.

BACKGROUND ART

A camera using a wide-angle lens or an omnidirectional mirror is used to allow a driver of a vehicle to check obstacles or various situations. For example, Patent Document 1 discloses a rear view display device that includes a wide-angle lens camera provided at a low position of a rear side of a vehicle, a narrow-angle lens camera provided at a high position of the rear side of the vehicle, and a vehicle state detection unit configured to switch and display a necessary image according to a state of the vehicle.

CITATION LIST

Patent Document

Patent Document 1: JP 2003-212041 A

SUMMARY OF THE INVENTION

Problem to be Solved by the Invention

In the technique of Patent Document 1, however, when images photographed by the two cameras including a wide-angle lens camera and a narrow-angle lens camera is displayed as a single image, the two images need to be combined and switched. In particular, image control needs to be performed to process the image from the wide-angle lens camera into an image having no sense of strangeness. Also, since the two cameras are needed, the cost inevitably increases.

Therefore, the present invention has been made in view of the above problems and is directed to provide an image processing device and the like that are capable of generating a more natural image from a distorted image photographed through a single camera.

Means for Solving the Problem

In order to solve the above problem, an aspect described in claim 1 includes: a distorted image acquiring means that acquires a distorted image through a photographing operation using a wide-angle lens or an omnidirectional mirror; a cutting reference point setting means that sets a cutting reference point for cutting a partial cut region from the distorted image; a cut region setting means that sets the cut region according to the cutting reference point; an eye vector setting means that sets an eye vector corresponding to the cutting reference point, with a photographing viewpoint of the distorted image as a base point; an offset means that shifts the cut region by a predetermined distance from the cutting reference point; and an image transforming means that transforms the shifted cut region through image transformation to transform the distorted image into a planar regular image according to the eye vector.

In the image processing device described in claim 1, an aspect described in claim 2 is characterized in that the image processing device further includes: a virtual spherical surface setting means that sets a virtual spherical surface with the center of the distorted image as a center, wherein the eye vector setting means sets an eye vector facing an intersection between the virtual spherical surface and a straight line orthogonal to a plane including the distorted image and passing through the cutting reference point from the center of the virtual spherical surface.

In the image processing device described in claim 1 or 2, an aspect described in claim 3 is characterized in that the eye vector setting means receives a parameter to specify the eye vector and sets the eye vector, the cut region setting means sets a region of the planar regular image corresponding to the cut region within a surface orthogonal to the eye vector at an intersection therebetween in the direction of the eye vector, the offset means shifts the set region of the planar regular image within the surface orthogonal to the eye vector, and the image transforming means finds a pixel value of the distorted image corresponding to each point of the shifted region of the planar regular image according to the eye vector, and sets the found pixel value of the distorted image to a pixel value of the planar regular image.

In the image processing device described in claim 3, an aspect described in claim 4 is characterized in that the surface orthogonal to the eye vector includes a surface of a cylinder.

In the image processing device described in any one of claims 1 to 4, an aspect described in claim 5 is characterized in that the eye vector setting means sets a plurality of eye vectors, the cut region setting means sets a cut region according to each of the eye vectors, the image transforming means transforms the cut region into a planar regular image, and the planar regular image found by the image transforming means is displayed on a single displaying means.

An aspect described in claim 6 is an image processing method, which is performed by an image processing device to process an image, including: a step of acquiring a distorted image through a photographing operation using a wide-angle lens or an omnidirectional mirror; a step of setting a cutting reference point for cutting a partial cut region from the distorted image; a step of setting the cut region according to the cutting reference point; a step of setting an eye vector corresponding to the cutting reference point, with a photographing viewpoint of the distorted image as a base point; a step of shifting the cut region by a predetermined distance from the cutting reference point; and a step of transforming the shifted cut region through image transformation to transform the distorted image into a planar regular image according to the eye vector.

An aspect described in claim 7 causes a computer to function as: a distorted image acquiring means that acquires a distorted image through a photographing operation using a wide-angle lens or an omnidirectional mirror; a cutting reference point setting means that sets a cutting reference point for cutting a partial cut region from the distorted image; a cut region setting means that sets the cut region according to the cutting reference point; an eye vector setting means that sets an eye vector corresponding to the cutting reference point, with a photographing viewpoint of the distorted image as a base point; an offset means that shifts the cut region by a predetermined distance from the cutting reference point; and an image transforming means that transforms the shifted cut region through image transformation to transform the distorted image into a planar regular image according to the eye vector.

An aspect described in claim 8 is a recording medium having stored therein a computer-readable program for an image processing device, which causes a computer to function as: a distorted image acquiring means that acquires a distorted image through a photographing operation using a wide-angle lens or an omnidirectional mirror; a cutting reference point setting means that sets a cutting reference point for cutting a partial cut region from the distorted image; a cut region setting means that sets the cut region according to the cutting reference point; an eye vector setting means that sets an eye vector corresponding to the cutting reference point, with a photographing viewpoint of the distorted image as a base point; an offset means that shifts the cut region by a predetermined distance from the cutting reference point; and an image transforming means that transforms the shifted cut region through image transformation to transform the distorted image into a planar regular image according to the eye vector.

An aspect described in claim 9 includes: a distorted image acquiring means that acquires a distorted image through a photographing operation using a wide-angle lens or an omnidirectional mirror; a cutting reference point setting means that sets a cutting reference point for cutting a partial cut region from the distorted image; a cut region setting means that sets the cut region according to the cutting reference point; an eye vector setting means that sets an eye vector corresponding to the cutting reference point, with a photographing viewpoint of the distorted image as a base point; an offset means that shifts the cut region by a predetermined distance from the cutting reference point; an image transforming means that transforms the shifted cut region through image transformation to transform the distorted image into a planar regular image according to the eye vector; and a displaying means that displays the planar regular image acquired through the image transforming means.

Effect of the Invention

According to the present invention, it is possible to generate a more natural image from a distorted image photographed through a single camera by: acquiring a distorted image through a photographing operation using a wide-angle lens or an omnidirectional mirror; setting a cutting reference point for cutting a partial cut region from the distorted image; setting the cut region according to the cutting reference point; setting an eye vector corresponding to the cutting reference point, with a photographing viewpoint of the distorted image as a base point; shifting the cut region by a predetermined distance from the cutting reference point; and transforming the shifted cut region through image transformation to transform the distorted image into a planar regular image according to the eye vector.

MODES FOR CARRYING OUT THE INVENTION

Hereafter, embodiments of the present invention will be described with reference to the drawings. Also, the embodiments to be described below are embodiments in the case where the present invention is applied to an image display system.

[1. Overview of Configuration and Function of Image Display System]

(1.1. Configuration and Function of Image Display System 1)

First, the configuration and function of an image display system according to an embodiment of the present invention will be described using FIG. 1.

Figure 1:
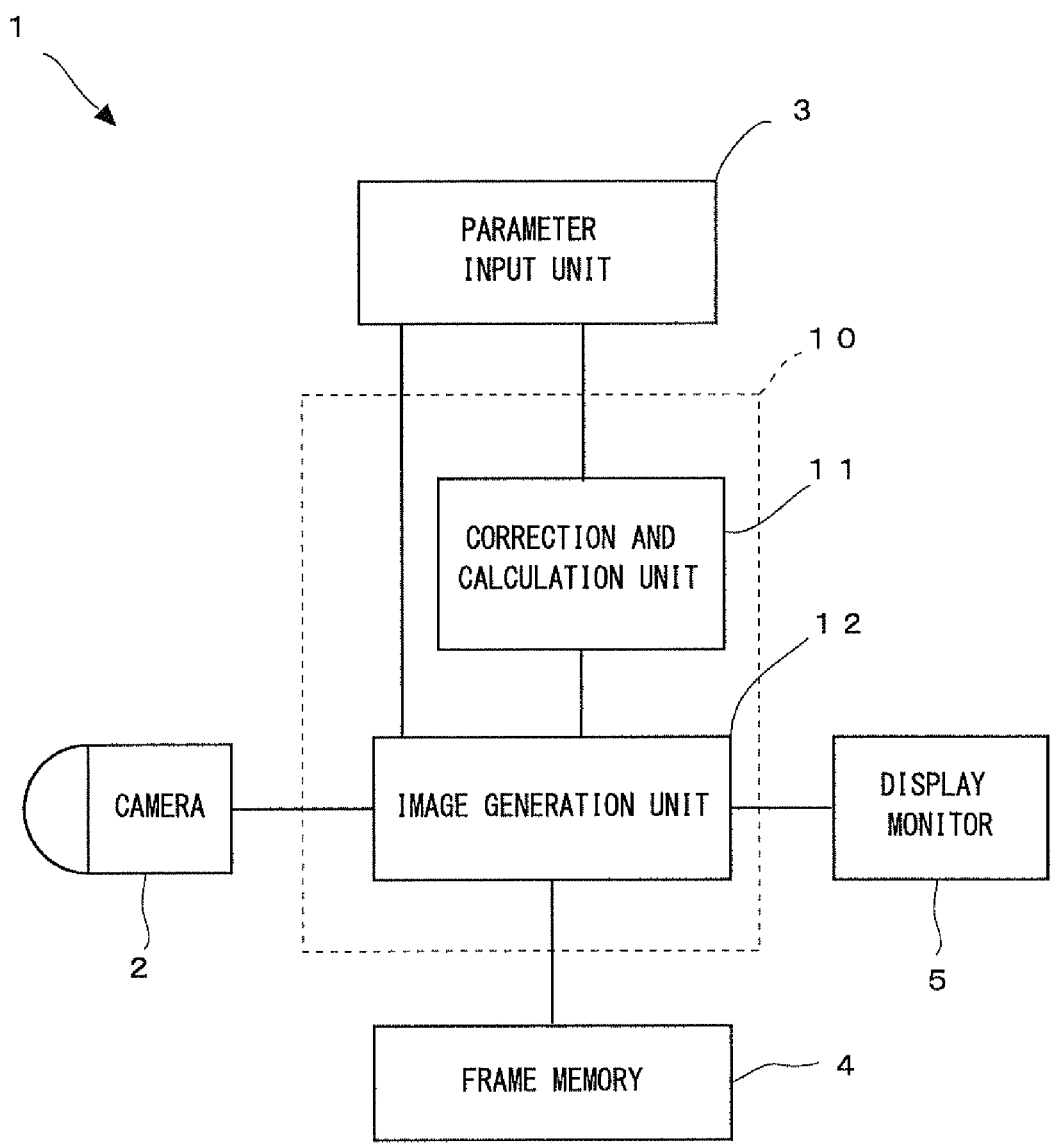
FIG. 1 is a block diagram illustrating a schematic configuration example of an image display system according to an embodiment of the present invention.

FIG. 1 is a block diagram illustrating a configuration example of the image display system 1 according to the present embodiment.

As illustrated in FIG. 1, the image display system 1 (example of an image display device) includes a camera 2, an image processing device 10, a parameter input unit 3, a frame memory 4, and a display monitor 5. The camera 2 includes a wide-angle lens or an omnidirectional minor. The image processing device 10 processes an image photographed through the camera 2. The parameter input unit 3 receives parameters required for the process of the image processing device 10. The frame memory 4 includes a memory required for calculation in the image processing device 10. The display monitor 5 displays the image acquired through the image processing device 10.

The camera 2 is, for example, an orthogonal projection fisheye lens, and outputs an animated distorted circular image (example of a distorted image). Also, the camera 2 is installed in a predetermined direction at a rear side or the like of the vehicle, and takes a wide-range image to eliminate blind spots. Incidentally, the lens of the camera 2 is not limited to a wide-angle lens, and may include a normal viewing-angle lens combined with an omnidirectional minor. The viewing angle of the wide-angle lens is not limited to 180°, and may be larger or smaller than 180°. The image photographed through the camera 2 may include a still image. When the camera 2 includes a diagonal fisheye lens, the camera 2 may output a rectangular distorted image. The camera 2 may include a non-orthogonal projection lens such as an equal-distance projection lens or equisolid-angle projection lens.

The parameter input unit 3 receives parameters required for transforming the distorted circular image into a planar regular image. For example, the parameter input unit 3 may receive an input of an eye vector with a photographing viewpoint of the distorted circular image as a base point, a parameter indicating the size of a planar regular image corresponding to a cut region acquired from the distorted circular image, or a parameter required for setting the magnification of the planar regular image to be displayed, based on a user's designation input. The planar regular image may include a planar regular image of which the distortion is reduced and which is coordinate-transformed according to a certain rule.

The frame memory 4 may be configured by a random access memory (RAM), a hard disk, a silicon disk, or the like as an example of a storing means. The frame memory 4 may store the distorted circular image photographed through the camera 2, image data that are being processed through image transformation, the transformed planar regular image, and the like.

The display monitor 5 is a monitor screen (flat screen) configured by a liquid crystal display element, an electro luminescence (EL) element or the like as a displaying means. The display monitor 5 may display the distorted circular image photographed through the camera 2 or the planar regular image acquired through the image transformation.

The image processing device 10 includes a correction and calculation unit 11 and an image generation unit 12. The correction and calculation unit 11 calculates a correction coefficient and corresponding coordinates. The image generation unit 12 transforms the distorted circular image into the planar regular image, and generates the planar regular image to be displayed on the display monitor 5.

The correction and calculation unit 11 may be configured by hardware using a large scale integration (LSI) chip to perform a dedicated calculation or the like. The correction and calculation unit 11 may execute a calculation using correspondence relation expressions of image transformation and calculate corresponding coordinates when arbitrary coordinates are applied from the image generation unit 12, or may execute a calculation using correspondence relation expressions of the image transformation and calculate corresponding coordinates when a cut region is shifted from a position corresponding to an eye vector. Incidentally, the correspondence relation expressions of the image transformation will be described in image transformation I and image transformation II.

The image generation unit 12 may be configured by hardware using a large scale integration (LSI) chip to perform a dedicated calculation. The image generation unit 12 may perform a calculation for image transformation from the distorted circular image to the planar regular image, and store or read the planar regular image generated through the image transformation into or from the frame memory 4.

(1.2 Image Transformation I)

Next, the basic principle of image transformation Ito transform a distorted circular image acquired through the camera 2 including a fisheye lens into a planar regular image of which distortion is reduced will be described using FIG. 2.

Figure 2:
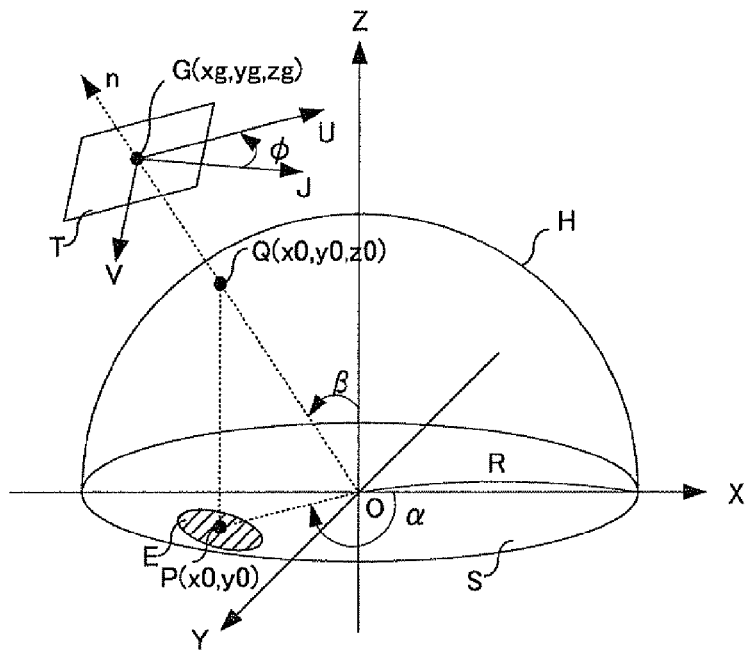
FIG. 2 is a perspective view illustrating an example of the relation between a two-dimensional XY orthogonal coordinate system including a distorted circular image S in a three-dimensional XYZ orthogonal coordinate system and a two-dimensional UV orthogonal system including a planar regular image T.

As illustrated in FIG. 2, a distorted circular image S formed on the XY plane is an image constructing a circle having a radius R, with the origin O of the coordinate system as the center of the circle. Also, the distorted circular image S is an image stored by distorting an image existing in a region having a viewing angle of 180° at a positive region of Z-axis in an optical axis of the lens. Incidentally, the model of FIG. 2 is a model when the distorted circular image is photographed through an orthogonal projection fisheye lens.

Herein, a partial region (cut region E) is cut from the distorted circular image S, and image transformation is performed thereon to acquire a planar regular image T. Therefore, as illustrated in FIG. 2, a cutting center point P ($x_0$, $y_0$) may be set as an example of a cutting reference point for determining which region is to be cut from the distorted circular image S. Incidentally, the cutting reference point may not be limited to the center.

Next, a virtual spherical surface H may be set, with the center of the distorted circular image S (example of a photographing viewpoint of the distorted image) being as the center. As illustrated in FIG. 2, an intersection Q ($x_0$, $y_0$, $z_0$) may be set between the virtual spherical surface H and a straight line that passes through the cutting center point P ($x_0$, $y_0$) set on the distorted circular image S and is parallel to the Z-axis (coordinate axis of the three-dimensional XYZ orthogonal coordinate system). An eye vector (example of an eye vector corresponding to the cutting reference point, with the photographing viewpoint of the distorted image as the base point) may be set to face the intersection Q ($x_0$, $y_0$, $z_0$) from the center of the distorted circular image.

Next, a tangent plane (example of a plane orthogonal to the eye vector at an intersection therebetween in the direction of the eye vector) coming into contact with the virtual spherical surface H at the intersection Q ($x_0$, $y_0$, $z_0$) is set, and a two-dimensional UV orthogonal coordinate system is set on the tangent plane.

According to a magnification m, the two-dimensional UV orthogonal coordinate system is parallel-shifted to be orthogonal to the eye vector n, and the planar regular image T is found as an image on the two-dimensional UV orthogonal coordinate system. The two-dimensional UV orthogonal coordinate system is set in such a manner that a point G ($x_g$, $y_g$, $z_g$) becomes the origin. According to the magnification m, the radius of the virtual spherical surface is varied, and the surface of the planar regular image T becomes a surface (surface orthogonal to the eye vector at an intersection therebetween in the direction of the eye vector) coming into contact with a virtual spherical surface acquired by varying the radius of the virtual spherical surface. Herein, the magnification m may indicate the relation between the scaling of a coordinate value (u, v) and the scaling of a coordinate value (x, y). Thus, a distance between two points O and G is set to m·R. Incidentally, the magnification m serving as a parameter may be input from the parameter input unit 3 and may be previously set. Also, as illustrated in FIG. 2, when the magnification m is larger than 1, the planar regular image T exists outside the virtual spherical surface H. When the magnification m is smaller than 1, the point G of the planar regular image T crossing the eye vector in the direction of the eye vector exists inside the virtual spherical surface H.

The position of the point G ($x_g$, $y_g$, $z_g$) may be specified by an azimuth angle α and a zenith angle β. Furthermore, in order to determine the UV coordinate system, an angle between U-axis and J-axis (rotation reference axis) is defined as a plane inclination angle φ. Incidentally, a vector from the origin O of the XY coordinate system to the origin G of the UV coordinate system is the eye vector n. Also, the azimuth angle α, the zenith angle β, and the plane inclination angle φ serving as parameters may be input from the parameter input unit 3, or may be previously set.

Herein, the distorted image within the cut region, of which the center is set to the cutting center point P ($x_0$, $y_0$) on the distorted circular image S defined on the XY coordinate system, is cut and deformed, and correspondence relation expressions for acquiring the planar regular image T on the UV coordinate system are given as Formulas (1) to (9).

[Mathematical Formula 1]

$$x = \frac{R(uA + vB + wC)}{\sqrt{u^2 + v^2 + w^2}} \quad (1)$$

$$y = \frac{R(uD + vE + wF)}{\sqrt{u^2 + v^2 + w^2}} \quad (2)$$

$$A = \cos\phi\cos\alpha - \sin\phi\sin\alpha\cos\beta \quad (3)$$

$$B = \sin\phi\cos\alpha - \cos\phi\sin\alpha\cos\beta \quad (4)$$

$$C = \sin\alpha\sin\beta \quad (5)$$

$$D = \cos\phi\sin\alpha + \sin\phi\cos\alpha\cos\beta \quad (6)$$

$$E = -\sin\phi\sin\alpha - \cos\phi\cos\alpha\cos\beta \quad (7)$$

$$F = -\cos\alpha\sin\beta \quad (8)$$

$$w = mR \quad (9)$$

The planar regular image acquired through transformation calculation based on these correspondence relation expressions has a small distortion in the horizontal direction, but has a large distortion in the vertical direction.

(1.3 Image Transformation II)

Next, the basic principle of image transformation II to transform a distorted circular image photographed using the camera 2 including a fisheye lens into a planar regular image of which distortion is reduced will be described using FIGS. 3 and 4. Incidentally, the image transformation II is a technique disclosed in JP 2010-62790 A.

In the model of FIG. 2, the UV coordinate system is set on the plane that passes through the point G ($x_g$, $y_g$, $z_g$) and is orthogonal to the eye vector n. In a model illustrated in FIG. 3, however, the UV coordinate system defined on the plane is curved along a cylinder side surface.

Figure 3:
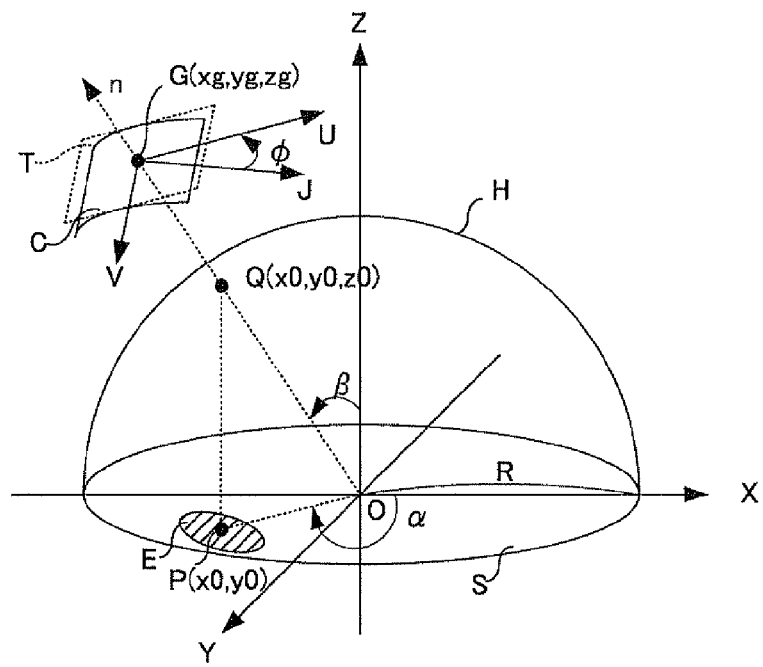
FIG. 3 is a perspective view illustrating an example of the relation between the two-dimensional XY orthogonal coordinate system and a two-dimensional UV curved coordinate system.

Therefore, in the model of FIG. 3, a curved planar regular image C is acquired on a two-dimensional UV curved coordinate system (coordinate system on the cylinder side surface).

A planar regular image T indicated by a dotted line in FIG. 3 is the same as the planar regular image T of FIG. 2, and the planar regular image C corresponds to an image acquired by curving the planar regular image T and is an image on the plane curved along the cylinder side surface.

The two-dimensional curved coordinate system is also a two-dimensional coordinate system having U-axis and Y-axis, and a point indicated by coordinates at which a single arbitrary point within the planar regular image C becomes (u, v) is the same as a point of a two-dimensional coordinate system on a normal plane. The two-dimensional curved coordinate system is a coordinate system set by curving a two-dimensional UV orthogonal coordinate system disposed on the plane orthogonal to the eye vector n, with the point G as the origin, along a side surface of a virtual cylinder.

Therefore, in the image transformation II, the planar regular image C is found on the two-dimensional UV curved coordinate system defined on the cylinder side surface, and pixel array data indicating the planar regular image C is used to perform pixel display on a normal monitor screen (flat screen).

Herein, the correspondence relation expression indicating the correspondence relation between the coordinates (u, v) of the two-dimensional UV orthogonal coordinate system and the coordinate (x, y) of the two-dimensional XY orthogonal coordinate system will be described.

Figure 4:
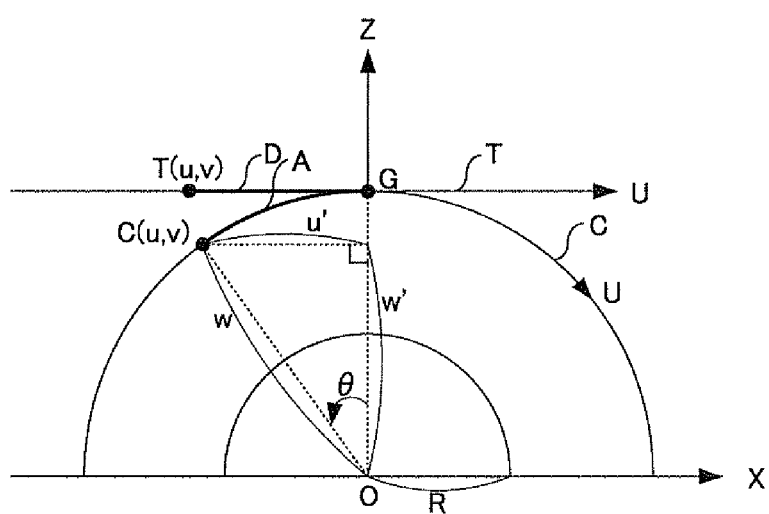
FIG. 4 is a plan view illustrating an example of the correspondence relation between a point T (u, v) on the two-dimensional UV orthogonal coordinate system and a point C (u, v) on the two-dimensional UV curved coordinate system.

FIG. 4 is a side view illustrating the position relation between the two-dimensional UV orthogonal coordinate system (coordinate plane is indicated by T of FIG. 4) and the two-dimensional UV curved coordinate system (coordinate plane is indicated by C of FIG. 4) acquired by curving the two-dimensional UV orthogonal coordinate system.

As illustrated in FIG. 4, there are a point T (u, v) in the two-dimensional UV orthogonal coordinate system and a point C (u, v) in the two-dimensional UV curved coordinate system, and thick line segments D and A have the same length. Although the two points are indicated by the coordinate (u, v), the positions of the points in the space shown by the XYZ three-dimensional orthogonal coordinate system are different from each other because the points are set in different coordinate systems. When the points are considered in the XYZ three-dimensional coordinate system, the coordinate value of the point T (u, v) becomes a point T (u, v, w), but the coordinate value of the point C (u, v) becomes a point C (u', v, w'). Therefore, the relation between u' and v' and u and v may be expressed as Formulas (10) to (12) below.

[Mathematical Formula 2]

$$\theta = \frac{u}{w} \quad (10)$$

-continued $$u' = w \cdot \sin\frac{u}{w} \quad (11)$$

$$w' = w \cdot \cos\frac{u}{w} \quad (12)$$

By applying Formulas (10) to (12) to Formulas (1) to (9), correspondence relation expressions for acquiring the planar regular image C on the UV coordinate system are given as Formulas (1') and (2') below.

[Mathematical Formula 3]

$$x = \frac{R(u'A + vB + w'C)}{\sqrt{u'^2 + v^2 + w'^2}} \quad (1')$$

$$y = \frac{R(u'D + vE + w'F)}{\sqrt{u'^2 + v^2 + w'^2}} \quad (2')$$

In this manner, From Formulas (1') and (2') in which the variable u and the variable w in Formulas (1) and (2) are substituted with a variable u' shown in Formula (11) and a variable w' shown in Formula (12), corresponding coordinates (x, y) in the two-dimensional XY orthogonal coordinate system are calculated.

The image transformation II may significantly improve the distortion around the left and right contour, as compared to the image transformation I. Even when horizontal panning is performed (panorama video is taken), a smooth panning video may be acquired. Thus, the image transformation II is suitable for securing the details of a person positioned at the right or left end of an image.

(1.4 Offset of Planar Regular Image)

Next, an offset function of displaying a planar regular image on a two-dimensional UV orthogonal coordinate system without changing an eye vector n will be described using FIGS. 5 and 6. Incidentally, the offset function will be first described using an example of the image transformation I.

Figure 5:
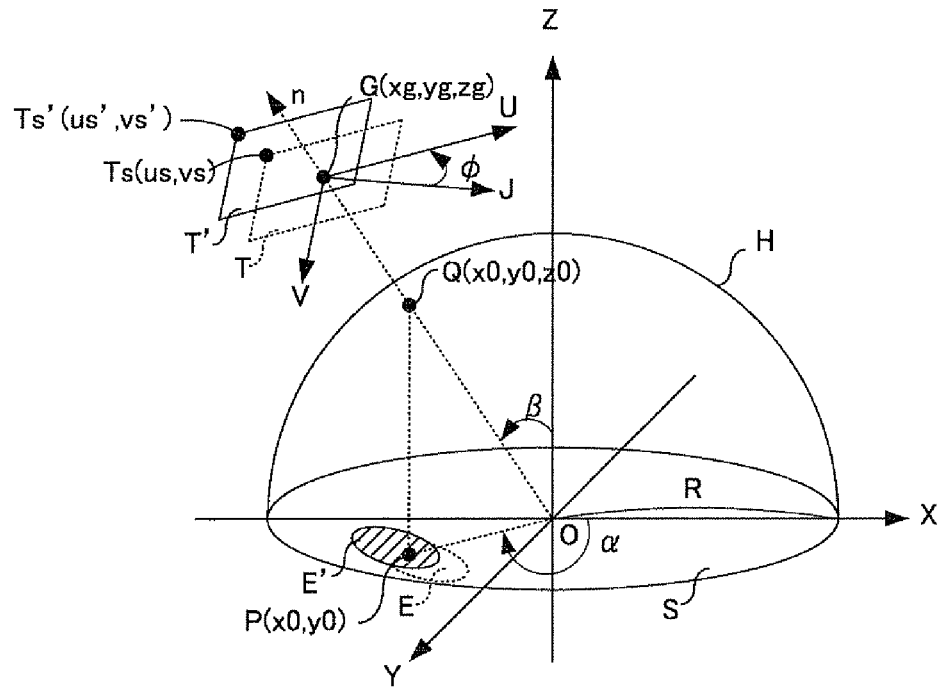
FIG. 5 is a perspective view illustrating an example of the relation between the planar regular image T and a planar regular image T' after offset and the relation between a cut region E and a cut region E' after offset.

As illustrated in FIG. 5, a cutting center point P $(x_0, y_0)$ of a cut region E is designated from the distorted circular image S, an azimuth angle α and a zenith angle β are acquired, and a planar regular image T is acquired by transforming the cut region E using the correspondence relation expressions shown in Formulas (1) to (9). Incidentally, FIG. 5 illustrates a model for transforming the cut region E indicated by a dotted line and acquiring the planar regular image T indicated by a dotted line.

Also, as illustrated in FIG. 5, the direction of the eye vector n is set to be constant without changing the cutting center point P $(x_0, y_0)$, and an offset is applied to shift a point at which image transformation is started. Then, a cut region E' is image-transformed to acquire a planar regular image T'. Incidentally, FIG. 5 also illustrates a model for transforming the cut region E indicated by a solid line and acquiring the planar regular image T' indicated by a solid line.

Figure 6:
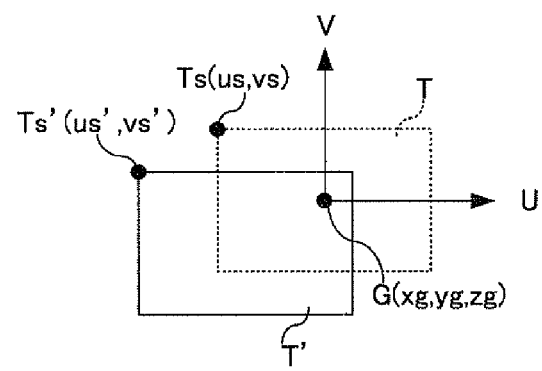
FIG. 6 is a plan view illustrating an example of the relation between the planar regular image T and the planar regular image T' after offset.

Also, as illustrated in FIGS. 5 and 6, a point G $(x_g, y_g, z_g)$ is set to the origin of the planar regular image T, and the start point of the image transformation for the cut region E included in the distorted circular image S is set to a point Ts $(u_s, v_s)$. The planar regular image T' is acquired by applying an offset in the U-axis direction and V-axis direction to the point Ts $(u_s, v_s)$ at which the image transformation is started, and changing the start point of the image transformation.

Then, the start point of image transformation for the planar regular image T' to which the offset was applied becomes a point $T_s'$ ($u_s'$, $v_s'$). The planar regular image T' is a plane perpendicular to the eye vector n.

When the offset function is applied to the image transformation I, correspondence relation expressions may be given as Formulas (13) and (14).

[Mathematical Formula 4]

$$x = \frac{R\{(u_s + u_{os})A + (v_s + v_{os})B + wC\}}{\sqrt{(u_s + u_{os})^2 + (v_s + v_{os})^2 + w^2}} \quad (13)$$

$$y = \frac{R\{(u_s + u_{os})D + (v_s + v_{os})E + wF\}}{\sqrt{(u_s + u_{os})^2 + (v_s + v_{os})^2 + w^2}} \quad (14)$$

Here, offset values $u_{os}$ and $v_{os}$ are applied to the start point Ts $(u_s, v_s)$ of the image transformation for the two-dimensional UV coordinate system. Thus, $u_s'=u_s+u_{os}$ and $v_s'=v_s+v_{os}$.

Next, correspondence relation expressions when the offset function is applied to the image transformation II will be shown.

When the offset values $u_{os}$ and $v_{os}$ are applied to the start point of the image transformation on the two-dimensional UV curved coordinate system, Formulas (15) to (17) are acquired in correspondence to Formulas (10) to (12).

[Mathematical Formula 5]

$$\theta = \frac{(u_s + u_{os})}{w} \quad (15)$$

$$u' = w \cdot \sin\frac{(u_s + u_{os})}{w} \quad (16)$$

$$w' = w \cdot \cos\frac{(u_s + u_{os})}{w} \quad (17)$$

Then, the correspondence relation expressions are given as Formulas (18) and (19).

[Mathematical Formula 6]

$$x = \frac{R\{u'A + (v_s + v_{os})B + w'C\}}{\sqrt{u'^2 + (v_s + v_{os})^2 + w'^2}} \quad (18)$$

$$y = \frac{R\{u'D + (v_s + v_{os})E + w'F\}}{\sqrt{u'^2 + (v_s + v_{os})^2 + w'^2}} \quad (19)$$

As the offset values are applied to the image transformation I or II, the coordinate values may be changed through sequential scanning from the start point of the image transformation so as to acquire a planar regular image.

Incidentally, in the case of a non-orthogonal projection image photographed through a non-orthogonal projection fisheye lens in the image transformation I or II, by using a coordinate conversion expression between coordinates on an orthogonal projection image and a non-orthogonal-projection image, the coordinates of the cutting center point P may be corrected, an intersection Q between the virtual spherical surface and a straight line passing the corrected point and parallel to the Z-axis may be defined, and a vector passing through the intersection Q with the origin O as the base point may be set to the eye vector n.

Also, when the viewing angle is smaller than 180°, the radius of the virtual spherical surface H is set to the viewing angle of 180° and is larger than the radius of the distorted circular image. A part of the distorted circular image, which corresponds to a viewing angle of 180° or more, is set in a replicated shape at the center of the virtual spherical surface H, because the radius of the virtual spherical surface H is set to the viewing angle of 180° when the viewing angle is larger than 180°.

[2. Operation of Image Display System]

Next, the operation of the image display system according to the embodiment of the present invention will be described using FIGS. 7 to 17.

Figure 7:
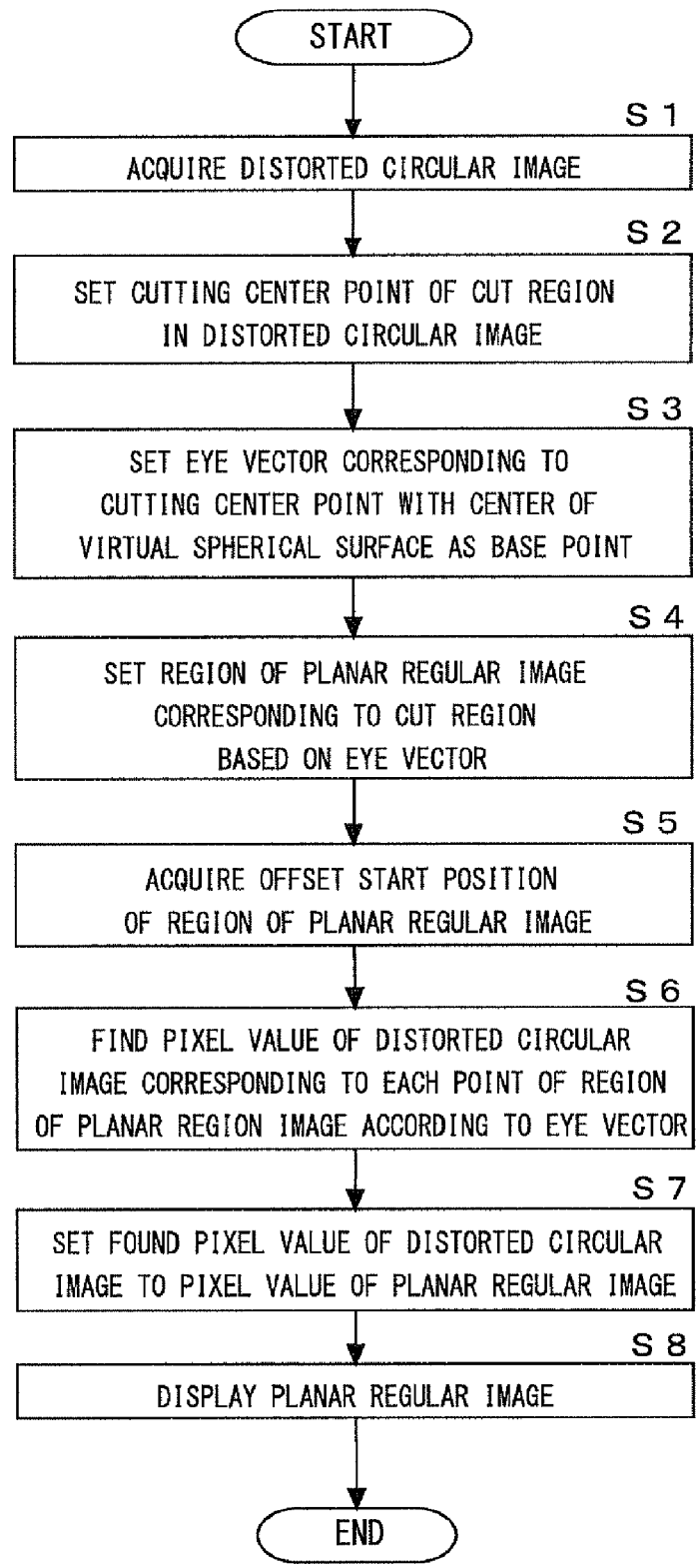
FIG. 7 is a flowchart illustrating an operation example of the image display system of FIG. 1.
Figure 8:
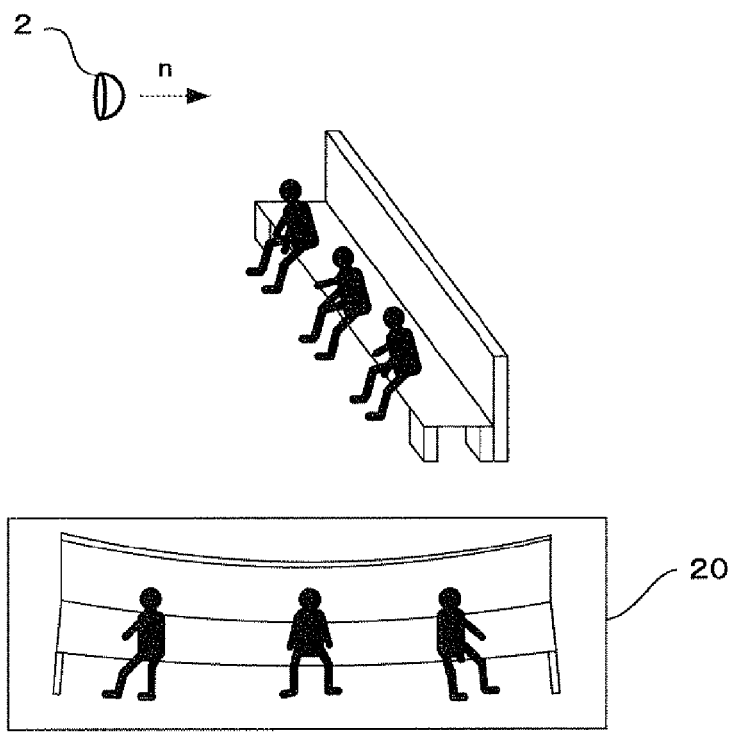
FIG. 8 is a schematic diagram illustrating an example of an image transformed through the direction of an eye vector and an offset function.

As illustrated in FIG. 7, the image processing device 10 acquires a distorted circular image (step S1). Specifically, the image generation unit 12 of the image processing device 10 acquires the distorted circular image S, which has been photographed by the camera 2, from the camera 2. Then, the image generation unit 12 of the image processing device 10 displays the distorted circular image S on the display monitor 5. Herein, as illustrated in FIG. 8, the direction of the camera 2 is a horizontal direction. It is assumed that the camera 2 is taking an image in which three persons are sitting on a bench positioned obliquely downward from the camera 2. Incidentally, the image processing device 10 may find the radius R of the distorted circular image from the distorted circular image S or the parameter input unit 3. As such, the image processing device 10 functions as an example of a distorted image acquiring means that acquires a distorted image through a photographing operation using a wide-angle lens or an omnidirectional mirror.

Next, the image processing device 10 sets a cutting center point of a cut region in the distorted circular image (step S2). Specifically, the coordinates of the cutting center point of the cut region in the distorted circular image S are input to the parameter input unit 3 by a user watching the display monitor 5. Also, the image generation unit 12 acquires information on the coordinates of the cutting center point of the cut region from the parameter input unit 3, and sets the cutting center point of the cut region E in the distorted circular image S. As such, the image processing device 10 functions as an example of a cutting reference point setting means that sets a cutting reference point for cutting a partial cut region from the distorted image.

Next, the image processing device 10 sets an eye vector corresponding to the cutting center point, with the center of the virtual spherical surface as the base point (step S3). As illustrated in FIG. 5, the cutting center point P ($x_0$, $y_0$) may be set to determine an azimuth angle α and a zenith angle β. When the azimuth angle α and the zenith angle β are determined, it may indicate that the direction of the eye vector is set. Also, when the eye vector n is set, it may indicate that A to F of Formulas (3) to (8) are set and the correspondence relation expressions (1) and (2) are determined. Incidentally, when the plane inclination angle φ is set to zero (φ=0), A to F of Formulas (3) to (8) are set. Also, the length of the eye vector n may be set to the distance m·R between the points O and G. The value of the plane inclination angle φ may be designated through the parameter input unit 3 by a user.

In the case of FIG. 5, the cutting center point P ($x_0$, $y_0$) is set, the azimuth angle α and the zenith angle β are determined, and the eye vector n is set. The eye vector n is set to face the intersection ($x_0$, $y_0$, $z_0$) at which the virtual spherical surface H and the straight line extending parallel to the Z-axis from the cutting center point P ($x_0$, $y_0$) cross each other, with the center O of the virtual spherical surface S as the base point.

In the case of FIG. 8, the cutting center point of the cut region E is set in the center O of the distorted circular image S, the azimuth angle α and the zenith angle β are determined to be zero (α=0 and β=0), and the eye vector n becomes the horizontal direction.

The image generation unit 12 of the image processing device 10 sets the direction of the eye vector n from the coordinate value of the cutting center point input to the parameter input unit 3. That is, the image generation unit 12 of the image processing device 10 sets the azimuth angle α and the zenith angle β from the coordinate value of the cutting center point input to the parameter input unit 3. Incidentally, a user may input the parameter values of the azimuth angle α and the zenith angle β into the parameter input unit 3 so as to set the cutting center point.

As such, the image processing device 10 functions as an example of an eye vector setting means that sets an eye vector corresponding to the cutting reference point, with the photographing viewpoint of the distorted image as the base point. Also, the image processing device 10 functions as an example of the eye vector setting means that sets an eye vector to face the intersection between the virtual spherical surface and the straight line orthogonal to the plane including the distorted image and passing through the cutting reference point from the center of the virtual spherical surface. Also, the image processing device 10 functions an example of the eye vector setting means that sets receives parameters for specifying an eye vector and sets the eye vector.

Next, the image processing device 10 sets a region of the planar regular image corresponding to the cut region based on the eye vector (step S4). Specifically, a user may operate the parameter input unit 3 to designate the magnification m and the size of the planar regular image T corresponding to the cut region E. Also, the image generation unit 12 acquires information on the size of the planar regular image T, which is designated through the parameter input unit 3, and sets a planar regular image T in the two-dimensional UV orthogonal coordinate system, based on the eye vector n. At this time, the point Ts ($u_s$, $v_s$) at which image transformation is started before offsets are applied may also be set. Incidentally, in the case of FIG. 8, the size of the planar regular image T corresponding to a planar regular image 20 to be output to the display monitor 5 is set. Also, in the case of the two-dimensional UV curved coordinate system of the image transformation II, the planar regular image T is set to the planar regular image C.

As such, the image processing device 10 functions as an example of a cut region setting means that sets a cut region according to the cutting reference point. Also, the image processing device 10 functions as an example of the cut region setting means that sets a region of a planar regular image corresponding to the cut region within a surface orthogonal to the eye vector, at the intersection therebetween in the direction of the eye vector.

Next, the image processing device 10 acquires an offset start position for the region of the planar regular image (step S5). Specifically, a user may operate the parameter input unit 3 to determine where and how much the planar regular image T is shifted to designate an offset. Then, the image generation unit 12 acquires the information on the offset designated through the parameter input unit 3, and sets the offset start point for the region of the planar regular image. More specifically, the image generation unit 12 sets a start point Ts' ($u_s'$, $v_s'$) of image transformation for the planar regular image T' to which the offset was applied. Incidentally, the image generation unit 12 may acquire information on which of the correspondence relation expressions (1) and (2), the correspondence relation expressions (1') and (2'), the correspondence relation expressions (13) and (14), and the correspondence relation expressions (18) and (19) are to be applied, through the parameter input unit 3.

As such, the image processing device 10 functions as an example of an offset means that shifts the cut region by a predetermined distance from the cutting reference point. Also, the image processing device 10 functions as an example of the offset means that shifts the set region of the planar regular image within the surface orthogonal to the eye vector.

Next, the image processing device 10 finds a pixel value of the distorted circular image corresponding to each point of the region of the planar regular image according to the eye vector (step S6). Specifically, the image generation unit 12 of the image processing device 10 transmits the data regarding the azimuth angle α and the zenith angle β corresponding to the eye vector, the data regarding the magnification m, the data regarding the radius R of the distorted circular image, and the data regarding the plane inclination angle φ to the correction and calculation unit 11. The correction and calculation unit 11 calculate and set the values A, B, C, D, E, F, and w from the received azimuth angle α, the received zenith angle β, the received plane inclination angle φ, the received magnification m, and received the radius R by applying Formulas (13) and (14). Also, the image generation unit 12 transmits information on which of the correspondence relation expressions (1) and (2), the correspondence relation expressions (1') and (2'), the correspondence relation expressions (13) and (14), and the correspondence relation expressions (18) and (19) are applied to perform image transformation, to the correction and calculation unit 11. Also, when the offset function is used, the image generation unit 12 of the image processing device 10 transmits data (data regarding offset values $u_{os}$ and $v_{os}$) related to an offset start position (point Ts' ($u_s'$, $v_s'$)), to the correction and calculation unit 11. Then, based on the coordinate value of the planar regular image T or T', pixel values of the distorted circular image are calculated according to the correspondence relation expressions (1) and (2), the correspondence relation expressions (1') and (2'), the correspondence relation expressions (13) and (14), and the correspondence relation expressions (18) and (19), that is, according to the eye vector.

Then the image generation unit 12 scans the region of the planar regular image T' for each pixel from the start point Ts' ($u_s'$, $v_s'$) of the image transformation, and transmits coordinate data of the pixel to the correction and calculation unit 11. The correction and calculation unit 11 sequentially calculates pixel values of the distorted circular image E' corresponding to the planar regular image T' according to the correspondence relation expressions (1) and (2), the correspondence relation expressions (1') and (2'), the correspondence relation expressions (13) and (14), and the correspondence relation expressions (18) and (19). Incidentally, the case of FIG. 8 may correspond to a case in which the correspondence relation expressions (18) and (19) are used when the offset function is applied to the image transformation II. The scan direction may be set to the direction u or v.

Next, the image processing device 10 sets the calculated pixel values of the distorted circular image to the pixel values of the planar regular image (step S7). Specifically, the image generation unit 12 of the image processing device 10 sequentially acquires the pixel values of the distorted circular image E', which are calculated through the correction and calculation unit 11. Then, the image generation unit 12 generates a planar regular image by plotting the pixel values of the distorted circular image E' into positions of the planar regular image T' according to the acquired pixel values.

As such, the image processing device 10 functions as an example of an image transforming means that transforms a shifted cut region through the image transformation that transforms a distorted image into a planar regular image according to an eye vector. Also, the image processing device 10 functions as an example of the image transforming means that finds the pixel value of the distorted image, which corresponds to each point of the shifted region of the planar regular image according to the eye vector, and sets the found pixel value of the distorted image to the pixel value of the planar regular image.

As such, the image processing device 10 functions as an example of a virtual spherical surface setting means that sets the correspondence relation expressions of the image transformation I and the image transformation II, and sets a virtual spherical surface with the center of the distorted image as the center.

Next, the image processing device 10 displays the planar regular image (step S8). Specifically, the image generation unit 12 of the image processing device 10 transmits the generated planar regular image, and the planar regular image is displayed on the display monitor 5. In the case of FIG. 8, the planar regular image 20 is displayed on the display monitor 5. As illustrated in FIG. 8, in the planar regular image 20, a person appearing at an end of the planar regular image 20 is also photographed in substantially a vertical direction of the drawing.

Figure 9:
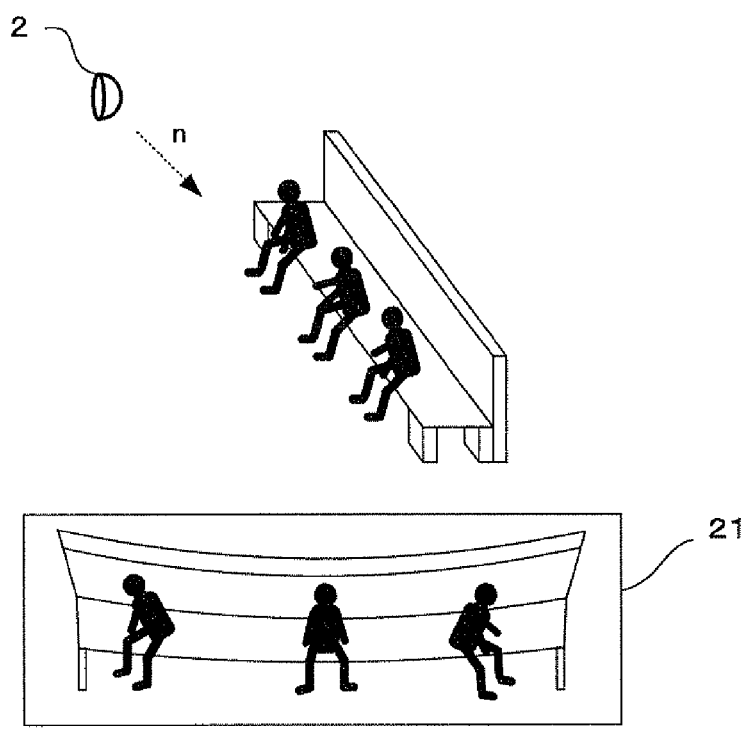
FIG. 9 is a schematic diagram illustrating an example of a transformed image without using the direction of an eye vector and an offset function.

Incidentally, as illustrated in FIG. 9, when the direction of the eye vector n is seen from a bird view, a person or a chair appearing at an end of the planar regular image 21 is photographed at an inclined angle.

When the camera 2 takes a moving image, the image processing device 10 repeats the above-described procedure for each frame image, generates a planar regular image of the moving image, and displays the planar regular image on the display monitor 5.

Next, a modification of the setting for the camera 2 and a method for displaying a planar regular image will be described using FIGS. 10 to 18.

First, an example in which a plurality of cutting reference points is set will be described using FIGS. 10 to 15.

Figure 10:
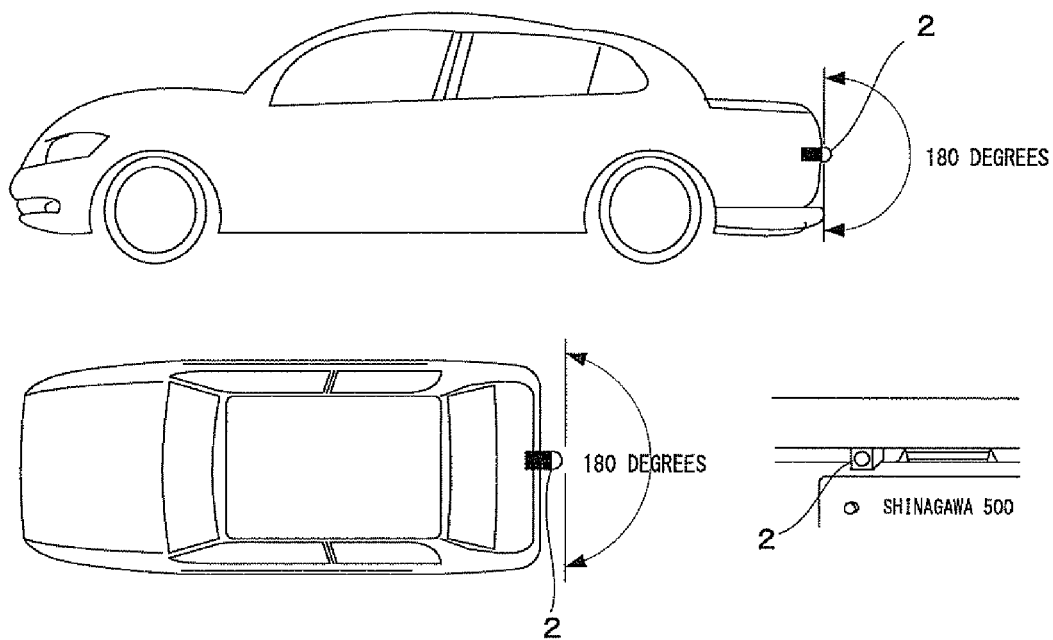
FIG. 10 is a schematic diagram illustrating an example in which a fisheye camera is provided at a rear side of a vehicle body.

As illustrated in FIG. 10, in the present embodiment, the camera 2 serving as a rear view camera is mounted on a vehicle body in a horizontal direction.

Figure 11:
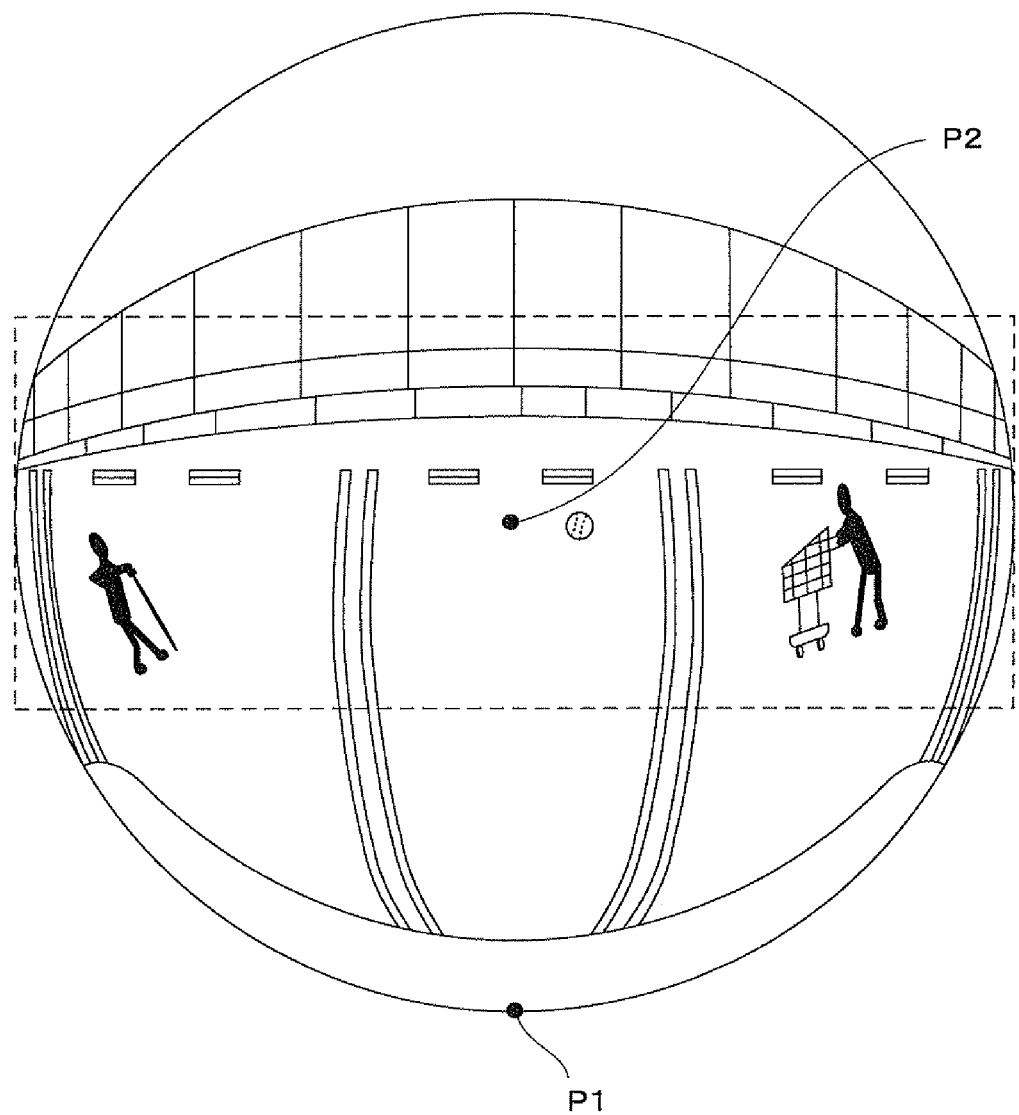
FIG. 11 is a schematic diagram illustrating an example of a distorted circular image photographed through a fisheye camera.

As illustrated in FIG. 11, when a vehicle provided with a fisheye camera at a rear side of the vehicle body is parked backward, the image processing device 10 acquires an original image of a distorted circular image photographed through the camera 2 (step S1).

Figure 12:
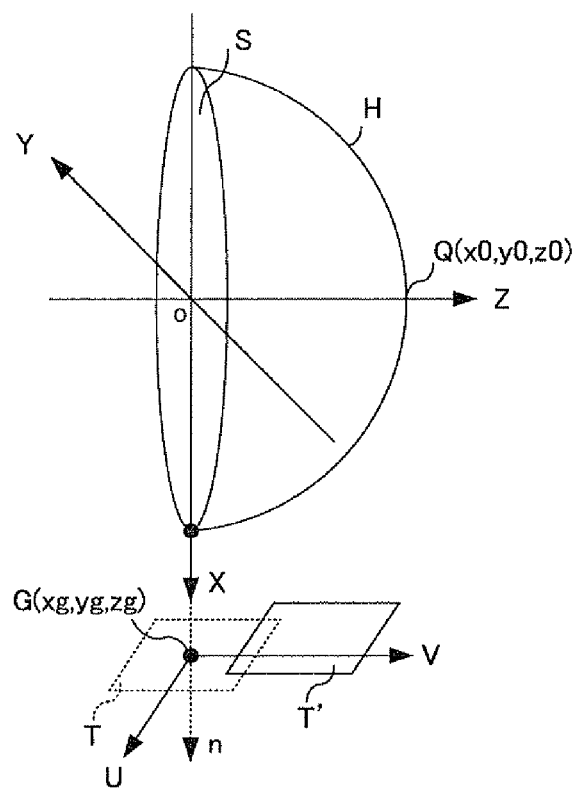
FIG. 12 is a perspective view illustrating an example of a planar regular image T' after offset in a state in which an eye vector is faced in a vertical direction with respect to an optical axis of a lens.

In order to display a bird-view image or the like, the image processing device 10 sets a cutting center point in a vertical direction with respect to the vehicle body as illustrated in FIG. 12 (step S2). As illustrated in FIG. 11, the cutting center point P1 is set with respect to the distorted circular image.

In this case, the azimuth angle α is set to 0°, the zenith angle β is set to 90°, and the eye vector n is set in the direction of the X-axis (step S3). Then, the image processing device 10 sets the size of the planar regular image T' (step S4).

Next, as illustrated in FIG. 10, when a user wants to control the display position of the image such that a bumper of the vehicle body is not displayed, the image processing device 10 sets an offset to shift the image from the position of the planar regular image T to the position of the planar regular image T' in the Z-axis direction, in a state in which the eye vector n is fixed in a vertical direction with respect to the optical axis (Z-axis) of the lens as illustrated in FIG. 12 (step S5). Then, the image processing device 10 applies the image transformation I, that is, the correspondence relation expressions (13) and (14), and generates the planar regular image T' as a bird-view image (steps S6 and S7).

Figure 13:
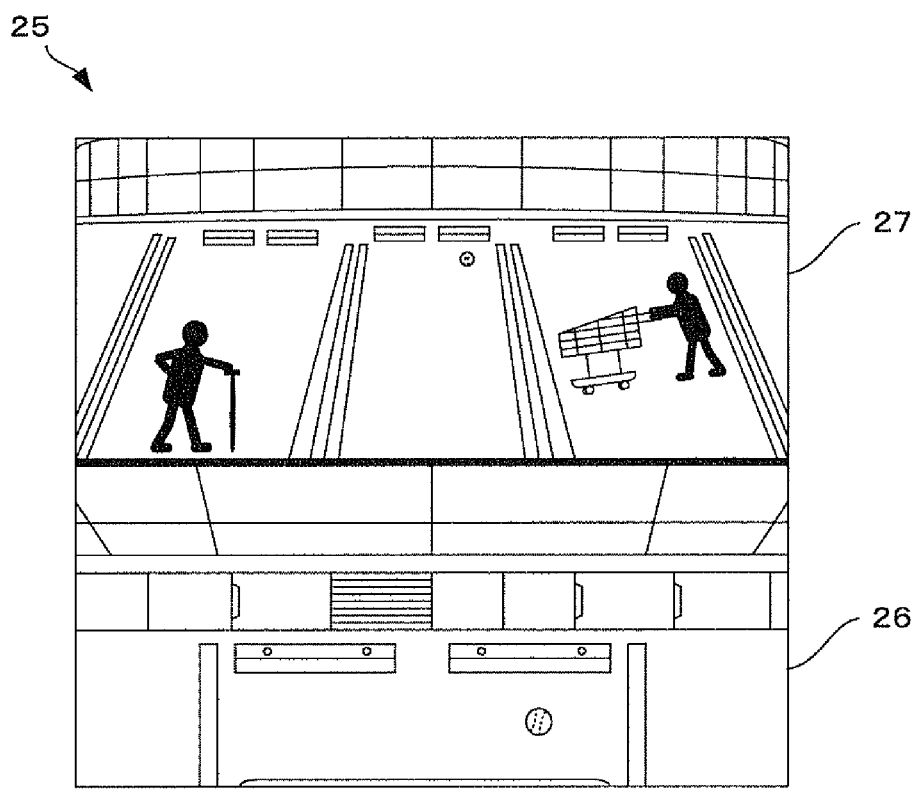
FIG. 13 is a schematic diagram illustrating an example of image display in which a panorama image and a bird-view image are displayed.

Next, as illustrated in FIG. 13, the image processing device 10 displays the bird-view image 26 at the bottom of the image 25 of the display monitor 5 (step S8).

Figure 14:
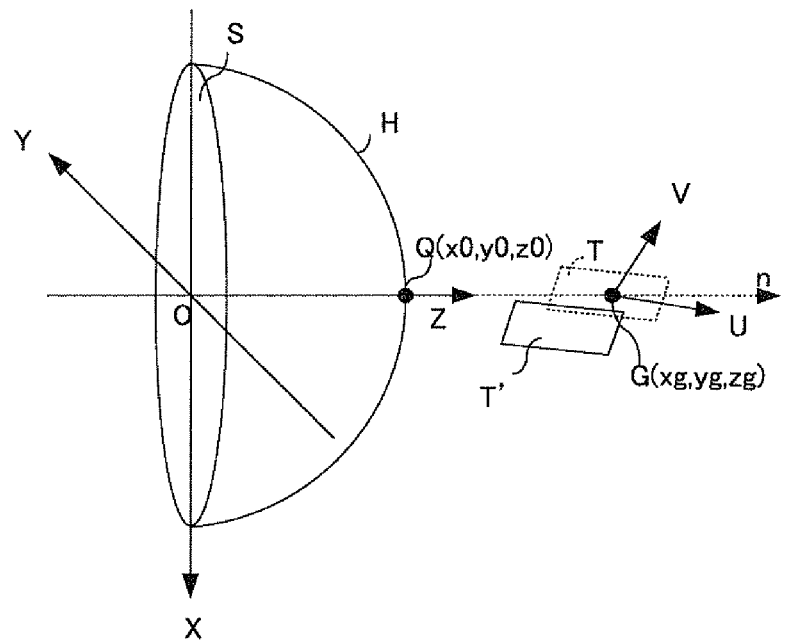
FIG. 14 is a perspective view illustrating an example of the planar regular image T' after offset in a state in which the eye vector is faced in a horizontal direction with respect to the optical axis of the lens.

Next, in relation with the panorama image 27 of the image 25 of the display monitor 5, the image processing device 10 sets the cutting center point in a horizontal direction with respect to the vehicle body as illustrated in FIG. 14 (step S2). As illustrated in FIG. 11, a cutting center point P2 is set with respect to the distorted circular image.

In this case, the azimuth angle α is set to 0°, the zenith angle β is set to 0°, and the eye vector n is set in the direction of the Z-axis (step S3). Then, the image processing device 10 sets the size of the planar regular image T for the panorama image (step S4).

Figure 15:
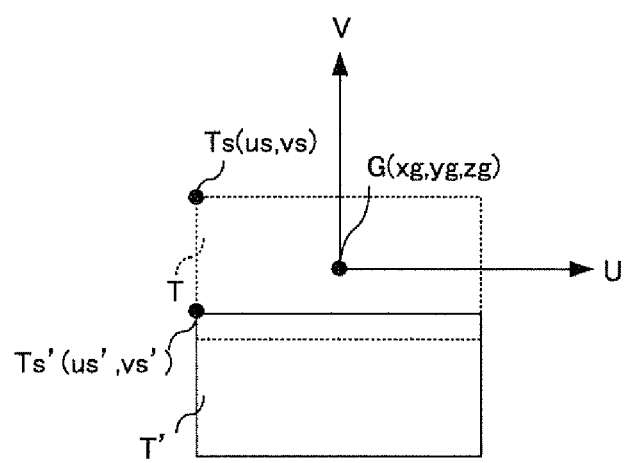
FIG. 15 is a plan view illustrating an example of the relation between the planar regular image T and the planar regular image T' after offset.

Next, when the display position of the panorama image is desired to be controlled through the offset function, the image processing device 10 sets an offset to display the panorama image from the position of the planar regular image T to the position of the planar regular image T' in the X-axis direction on the two-dimensional UV coordinate system, in a state in which the eye vector n is fixed to the optical axis of the lens as illustrated in FIG. 15 (step S5). Then, the image processing device 10 applies the image transformation II, that is, the correspondence relation expressions (18) and (19), and generates the planar regular image T' as the panorama image 27 (steps S6 and S7).

Next, as illustrated in FIG. 13, the image processing device 10 displays the panorama image 27 at the top of the image 25 of the display monitor 5 (step S8).

Next, an example in which a plurality of cutting reference points is set will be described using FIGS. 16 to 18.

Figure 16:
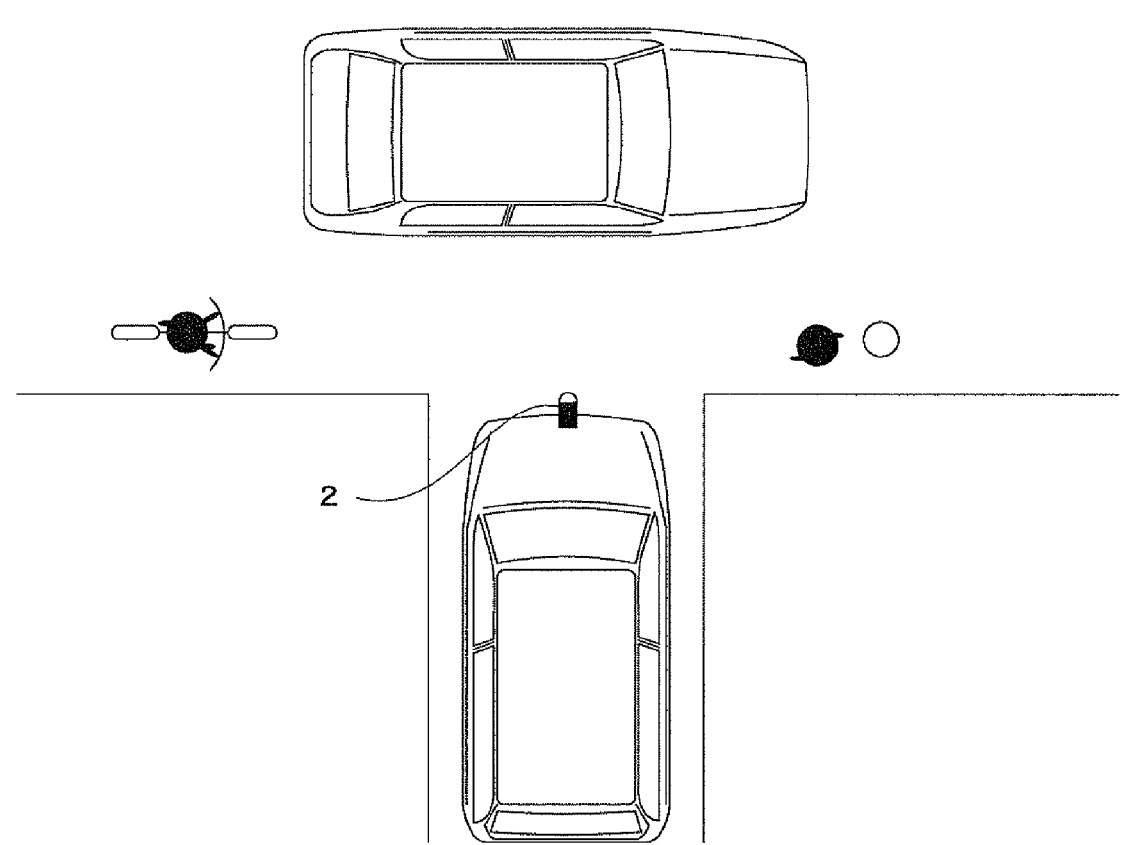
FIG. 16 is an overhead view illustrating a state in which a vehicle provided with a fisheye camera at a front side of the vehicle body is parked on a T-shaped road.

FIG. 16 is an overhead view illustrating a state in which a vehicle provided with the camera 2 at a front side of the vehicle body is parked on a T-shaped road.

As illustrated in FIG. 16, the camera 2 serving as a front view camera of the vehicle body is mounted in the horizontal direction.

Figure 17:
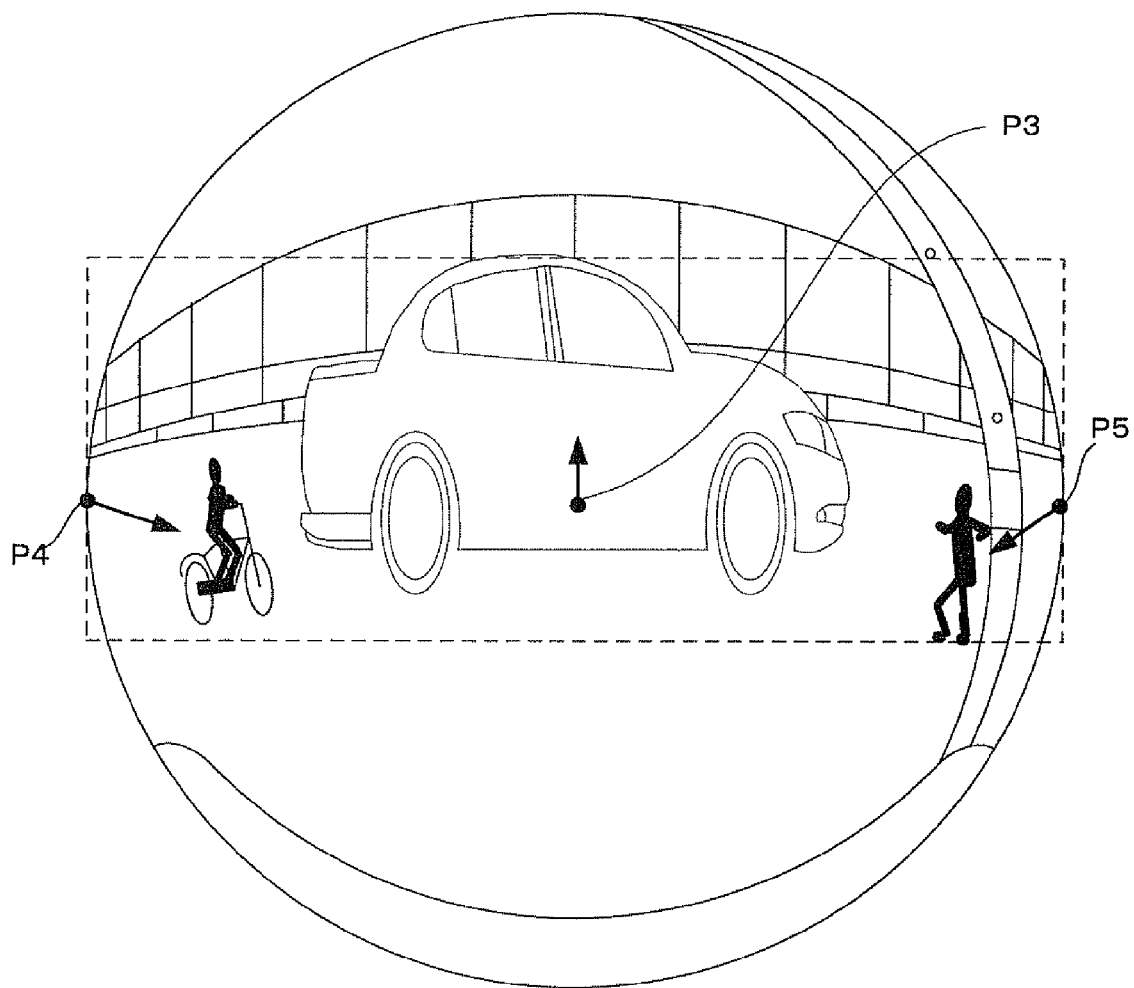
FIG. 17 is a schematic diagram illustrating an example of a distorted circular image photographed through a fisheye camera.

When the vehicle provided with the camera 2 at the front side of the vehicle body is parked in the T-shaped road, the image processing device 10 acquires an original image of a distorted circular image photographed through the camera 2 as illustrated in FIG. 17.

Figure 18:
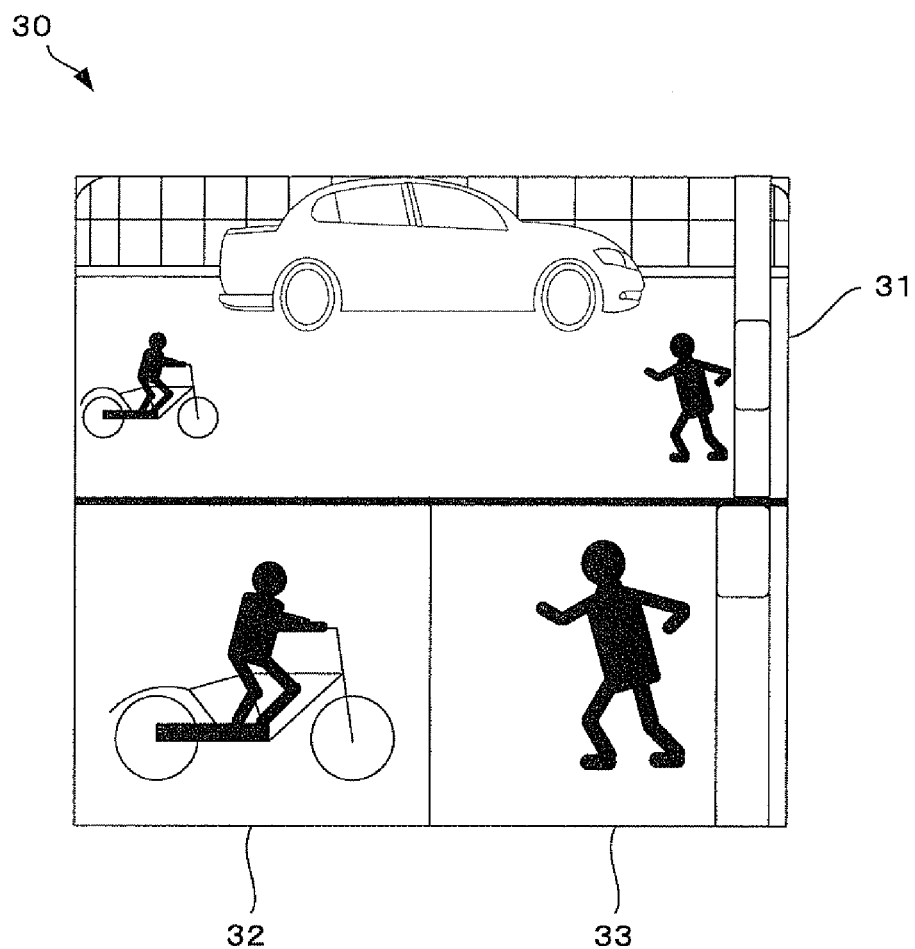
FIG. 18 is a schematic diagram illustrating an example of image display in which a plurality of planar regular images is displayed.

Next, in order to generate a panorama image 31 of an image 30 as illustrated in FIG. 18, the image processing device 10 sets a cutting center point P3 with respect to the distorted circular image, and sets the size of a planar regular image for the panorama image 31. Then, the image processing device 10 offsets the distorted circular image in the direction of an arrow of FIG. 17, and generates the panorama image 31 through the image transformation II. Incidentally, the panorama image 31 is an image acquired by transforming a part of the distorted circular image, which is indicated by a dotted line of FIG. 17, and panorama-displaying the transformed image.

Next, in order to generate a partially expanded image 32 of the image 30, the image processing device 10 sets the cutting center point P3 with respect to the distorted circular image, and sets the size of a planar regular image for the partially expanded image 32. Then, the image processing device 10 offsets the distorted circular image in the arrow direction of FIG. 17, and generates the partially expanded image 32 through the image transformation I or II.

Next, in order to generate a partially expanded image 33 of the image 30, the image processing device 10 sets a cutting center point P4 with respect to the distorted circular image, and sets the size of the planar regular image for the partially expanded image 33. Then, the image processing device 10 offsets the distorted circular image in the arrow direction of FIG. 17, and generate the partially expanded image 32 through the image transformation I or II.

According to the present embodiment, the distorted circular image S (an example of the distorted image) photographed through the camera 2 using the wide-angle lens and the omnidirectional mirror is acquired, the cutting center point P (an example of the cutting reference point) for cutting a partial cut region from the distorted circular image S is set, the cut region E is set according to the cutting center point P, the eye vector n corresponding to the cutting center point P is set with the photographing view point of the distorted circular image S as the base point, the cut region E is shifted at a predetermined distance from the cutting center point P, and the shifted cut region E' is transformed through the image transformation (the correspondence relation expressions (1) and (2), the correspondence relation expressions (1') and (2'), the correspondence relation expressions (13) and (14), and the correspondence relation expressions (18) and (19)) that transforms the distorted circular image S into the planar regular images T and C according to the eye vector n. Thus, a natural image may be generated from the distorted image photographed through a single camera.

In particular, according to the variety of correspondence relation expressions for image transformation, a more natural planar regular image may be acquired through the offset function of shifting the cut region in a state in which the eye vector n is fixed. For example, as illustrated in FIG. 8, a panorama image of the planar regular image may be more naturally generated at a position distant from the center of the distorted circular image. Thus, even when a distorted circular image is acquired through a camera installed in the horizontal direction with respect to the vehicle, a more natural image is generated. Therefore, a user may easily check the situation of objects such as an obstacle in the direction of the ground. In particular, when the image transformation II is used, the user may easily check an object in the horizontal direction with respect to the vehicle body or the like.

Also, since the image processing device 10 generates a planar regular image from a distorted circular image photographed through a single camera 2, the image does not need to be combined. Also, since the planar regular image is generated from the distorted circular image photographed through a single camera 2, the cost may be reduced.

Also, when the case in which the eye vector n is fixed in the horizontal direction and the offset function is used to photograph an image as illustrated in FIG. 8 is compared to the case in which the eye vector n is directed to a person and an image is photographed without using the offset function as illustrated in FIG. 9, the direction of the eye vector n in the planar regular image 21 of FIG. 9 is set in a bird-view state. Thus, the vertical direction of the person or chair is obliquely inclined so that the planar regular image 21 becomes an image having a feeling of strangeness. On the other hand, the direction of the eye vector n in the planar regular image 20 of FIG. 8 faces the horizontal direction. Thus, the vertical direction of the person or chair is not inclined, so that the planar regular image 20 becomes an image having no feeling of strangeness. Therefore, since the person is vertically displayed, the person may be easily detected from the planar regular image 20, which makes it easy to perform image recognition. Also, the distortion of the outer part (around the contour) may be reduced, and the details of the person may be easily checked. Thus, it becomes easy to recognize a distance and determine an object, when seen from the eyes of human beings.

Also, in order to display a bird-view image, a general rear view camera needs to be installed at an inclined angle in the vertical direction from the horizontal direction with respect to a vehicle body. However, the limitation in angle of the rear view camera may be reduced to enlarge the range of viewing field.

Also, when the virtual spherical surface H is set with the center O of the distorted circular image S, an example of the distorted image, as the center and the eye vector n is set to face the intersection Q between the virtual spherical surface H and the straight line orthogonal to the plane including the distorted image and passing through the cutting center point from the center of the virtual spherical surface H, it is possible to acquire the planar regular image of which distortion is reduced. Also, the correspondence relation expressions of the image transformation I or II may be easily acquired.

Also, when the parameters to specify the eye vector n are received to set the eye vector, the region of the planar regular image T corresponding to the cut region E is set within the surface orthogonal to the eye vector n at the intersection Q therebetween in the direction of the eye vector n, the set region of the planar regular image T are shifted within the surface orthogonal to the eye vector, the pixel value of the distorted image, which corresponds to each point of the shifted region of the planar regular image T', is found according to the eye vector n, and the found pixel value of the distorted image is set to the pixel value of the planar regular image T', it is possible to acquire the planar regular image of which distortion is reduced. Also, the correspondence relation expressions of the image transformation I or II having the offset function may be easily acquired.

Also, when the surface orthogonal to the eye vector at the intersection Q therebetween in the direction of the eye vector n is the surface C of the cylinder, it is possible to acquire the planar regular image of the panorama image, of which distortion is reduced.

Also, when cut regions are set according to each eye vector and are transformed into planar regular images and each the planar regular image found by the image transforming means is displayed on a single displaying means, the image transformations I and II and the offset function may be combined to display a high-precision planar regular image in various directions of the distorted image, according to the use.

For example, as illustrated in FIG. 13 or 18, the planar regular images of the image transformations I and II may be used together to display an image. As illustrated in FIG. 13, an object or person at the right or left end may be precisely and easily checked through the panorama image 27, and a curbstone or obstacle during parking may be easily checked through the bird-view image 26.

Figure 19:
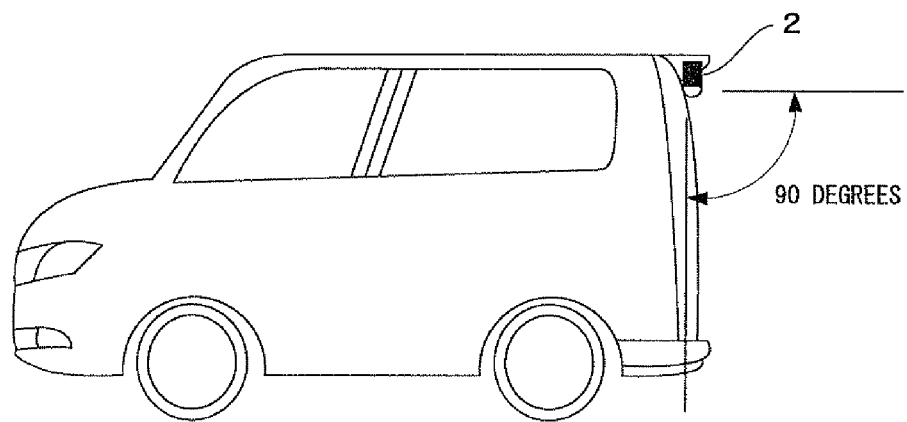
FIG. 19 is a schematic diagram illustrating an example in which a fisheye camera is provided at a rear side of a vehicle body.

Incidentally, as illustrated in FIG. 19, the camera 2 may be set at a rear side of the vehicle body such that the optical axis of the lens becomes vertical to the vehicle body. In this case, in order to display the bird-view image 26 of FIG. 13, the eye vector n may be set in the direction of the optical axis, and the correspondence relation expressions of the image transformation I or II may be used without using the offset function. Also, the offset function may be used or the direction of the eye vector n may be changed in such a manner that a bumper is not included. Also, in order to display the panorama image 27 of FIG. 13, the eye vector n may be set in the direction of the optical axis, the planar regular image T may be shifted in the horizontal direction by the offset function, and the correspondence relation expressions of the image transformation II may be used.

Figure 20:
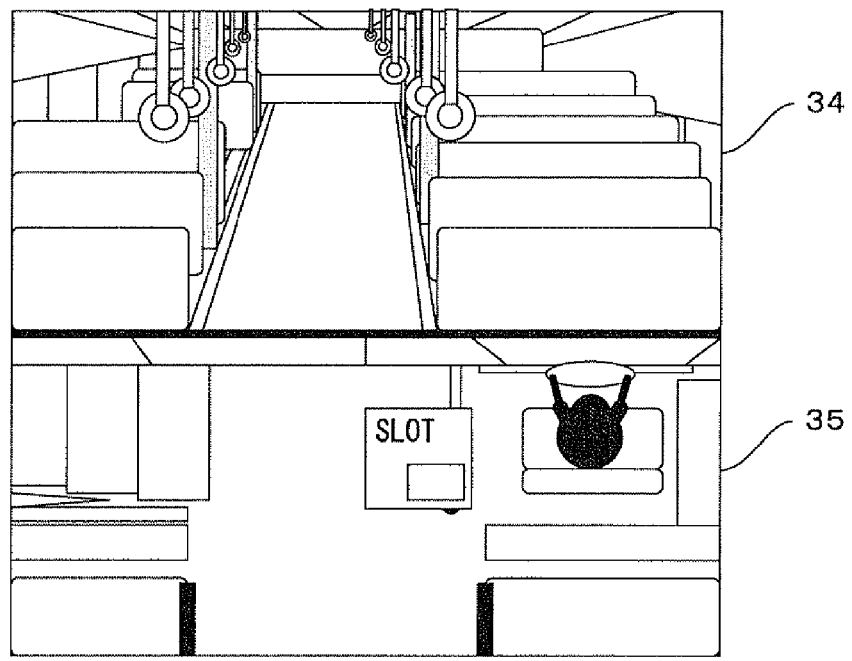
FIG. 20 is a schematic diagram illustrating an example in which a plurality of planar regular images is displayed.

Also, as illustrated in FIG. 20, the camera 2 may be installed at the top of a driver's seat of a bus so as to display an image 34 in the direction of passenger seats and an image 35 overlooking the driver's seat. Then, the entire state of the inside of the bus may be easily checked through a single camera. When these images are used for image recognition, persons may be easily recognized, the number of persons inside the bus may be easily checked, and the faces of the persons may be easily recognized.

Figure 21:
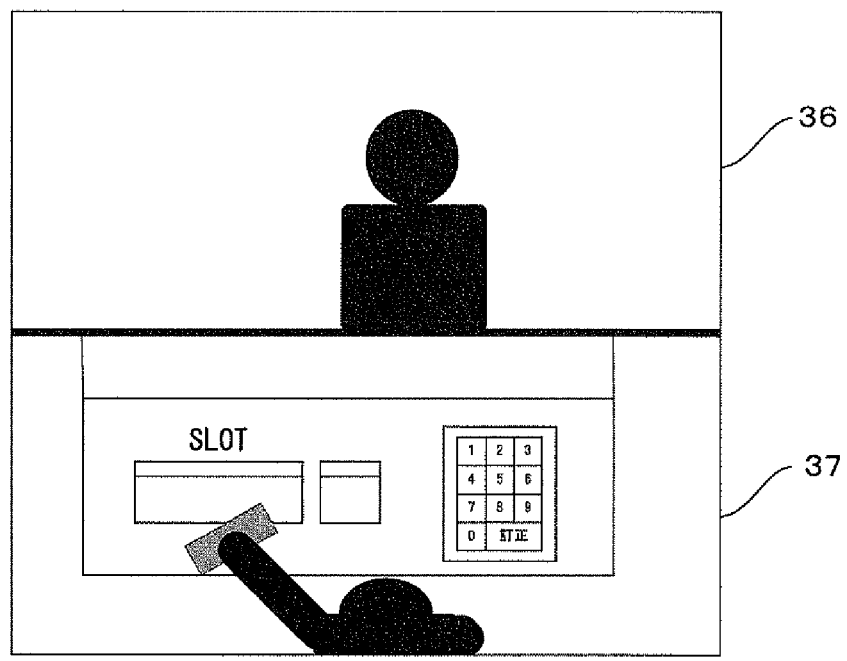
FIG. 21 is a schematic diagram illustrating an example in which a plurality of planar regular image is displayed.

Also, as illustrated in FIG. 21, the camera 2 may be installed at the top of an automatic teller machine (ATM) so as to display an image 36 facing the direction of an ATM user and an image 37 overlooking an input part of the ATM. The state of the ATM user or the state of the manipulation may be easily checked through a single camera. When these images are used for image recognition, the face or manipulation of the ATM user may be easily recognized.

Incidentally, the process performed by the image display system 1 or the image processing device 10 may be performed by a computer with a central processing unit (CPU). The image transformation I, the image transformation II, the offset function, and the like may be performed by the computer.

Furthermore, the present invention is not limited to the above-described embodiments. Each of the above-described embodiments is only an example. Any examples that have substantially the same configuration and exhibit substantially the same operational effect as a technical idea described in claims of the present invention are included in the scope of the present invention.

EXPLANATION OF REFERENCE NUMERALS 1 image display system (image display device)
2 camera
3 parameter input unit
4 frame memory
5 display monitor (displaying means)
10 image processing device
11 correction and calculation unit
12 image generation unit
S distorted circular image (distorted image)
P cutting center point (cutting reference point)
E, E' cut region
N eye vector
T, T', C planar regular image
H virtual spherical surface

The invention claimed is:
1. An image processing device comprising:
a distorted image acquiring unit that acquires a distorted image through a photographing operation using a wide-angle lens or an omnidirectional mirror;
a cutting reference point setting unit that sets a cutting reference point for cutting a partial cut region from the distorted image;
a cut region setting unit that sets the cut region according to the cutting reference point;
an eye vector setting unit that sets an eye vector corresponding to the cutting reference point, with a photographing viewpoint of the distorted image as a base point;
an offset unit that shifts the cut region by a predetermined distance from the cutting reference point; and an image transforming unit that transforms the shifted cut region through image transformation to transform the distorted image into a planar regular image according to the eye vector.

2. The image processing device according to claim 1, further comprising:
a virtual spherical surface setting unit that sets a virtual spherical surface with the center of the distorted image as a center, wherein the eye vector setting unit sets an eye vector facing an intersection between the virtual spherical surface and a straight line orthogonal to a plane including the distorted image and passing through the cutting reference point from the center of the virtual spherical surface.

3. The image processing device according to claim 1, wherein
the eye vector setting unit receives a parameter to specify the eye vector and sets the eye vector,
the cut region setting unit sets a region of the planar regular image corresponding to the cut region within a surface orthogonal to the eye vector at an intersection therebetween in the direction of the eye vector,
the offset unit shifts the set region of the planar regular image within the surface orthogonal to the eye vector, and
the image transforming unit finds a pixel value of the distorted image corresponding to each point of the shifted region of the planar regular image according to the eye vector, and sets the found pixel value of the distorted image to a pixel value of the planar regular image.

4. The image processing device according to claim 3, wherein
the surface orthogonal to the eye vector comprises a surface of a cylinder.

5. The image processing device according to claim 1, wherein
the eye vector setting unit sets a plurality of eye vectors,
the cut region setting unit sets a cut region according to each of the eye vectors,
the image transforming unit transforms the cut region into a planar regular image, and
the planar regular image found by the image transforming unit is displayed on a single displaying unit.

6. An image processing method, which is performed by an image processing device to process an image, the image processing method comprising:
a step of acquiring a distorted image through a photographing operation using a wide-angle lens or an omnidirectional mirror;
a step of setting a cutting reference point for cutting a partial cut region from the distorted image;
a step of setting the cut region according to the cutting reference point;
a step of setting an eye vector corresponding to the cutting reference point, with a photographing viewpoint of the distorted image as a base point;
a step of shifting the cut region by a predetermined distance from the cutting reference point; and
a step of transforming the shifted cut region through image transformation to transform the distorted image into a planar regular image according to the eye vector.

7. A non-transitory recording medium having stored therein a computer-readable program for an image processing device, which causes a computer to function as:

a distorted image acquiring unit that acquires a distorted image through a photographing operation using a wide-angle lens or an omnidirectional mirror;
a cutting reference point setting unit that sets a cutting reference point for cutting a partial cut region from the distorted image;
a cut region setting unit that sets the cut region according to the cutting reference point;
an eye vector setting unit that sets an eye vector corresponding to the cutting reference point, with a photographing viewpoint of the distorted image as a base point;
an offset unit that shifts the cut region by a predetermined distance from the cutting reference point; and
an image transforming unit that transforms the shifted cut region through image transformation to transform the distorted image into a planar regular image according to the eye vector.

8. An image display device comprising:
a distorted image acquiring unit that acquires a distorted image through a photographing operation using a wide-angle lens or an omnidirectional mirror;
a cutting reference point setting unit that sets a cutting reference point for cutting a partial cut region from the distorted image;
a cut region setting unit that sets the cut region according to the cutting reference point;
an eye vector setting unit that sets an eye vector corresponding to the cutting reference point, with a photographing viewpoint of the distorted image as a base point;
an offset unit that shifts the cut region by a predetermined distance from the cutting reference point;
an image transforming unit that transforms the shifted cut region through image transformation to transform the distorted image into a planar regular image according to the eye vector; and
a displaying unit that displays the planar regular image acquired through the image transforming unit.

9. The image processing device according to claim 2, wherein
the eye vector setting unit receives a parameter to specify the eye vector and sets the eye vector,
the cut region setting unit sets a region of the planar regular image corresponding to the cut region within a surface orthogonal to the eye vector at an intersection therebetween in the direction of the eye vector,
the offset unit shifts the set region of the planar regular image within the surface orthogonal to the eye vector, and
the image transforming unit finds a pixel value of the distorted image corresponding to each point of the shifted region of the planar regular image according to the eye vector, and sets the found pixel value of the distorted image to a pixel value of the planar regular image.

10. The image processing device according to any one of claim 2, wherein
the eye vector setting unit sets a plurality of eye vectors,
the cut region setting unit sets a cut region according to each of the eye vectors,
the image transforming unit transforms the cut region into a planar regular image, and
the planar regular image found by the image transforming unit is displayed on a single displaying unit.

11. The image processing device according to any one of claim 3, wherein the eye vector setting unit sets a plurality of eye vectors, the cut region setting unit sets a cut region according to each of the eye vectors, the image transforming unit transforms the cut region into a planar regular image, and the planar regular image found by the image transforming unit is displayed on a single displaying unit.

12. The image processing device according to any one of claim 4, wherein the eye vector setting unit sets a plurality of eye vectors, the cut region setting unit sets a cut region according to each of the eye vectors, the image transforming unit transforms the cut region into a planar regular image, and the planar regular image found by the image transforming unit is displayed on a single displaying unit.

13. The image processing device according to any one of claim 9, wherein the eye vector setting unit sets a plurality of eye vectors, the cut region setting unit sets a cut region according to each of the eye vectors, the image transforming unit transforms the cut region into a planar regular image, and the planar regular image found by the image transforming unit is displayed on a single displaying unit.

\* \* \* \* \*